United States Patent [19]

Brotz

[11] Patent Number: 5,252,073
[45] Date of Patent: Oct. 12, 1993

[54] METHOD OF ART INSTRUCTION

[76] Inventor: Gregory R. Brotz, P.O. Box 1322, Sheboygan, Wis. 53081

[21] Appl. No.: 909,674

[22] Filed: Jul. 7, 1992

[51] Int. Cl.$^5$ .............................................. G09B 11/00
[52] U.S. Cl. ................................. 434/88; 434/81; 434/84
[58] Field of Search ............... 434/81, 84, 85, 88, 434/87

[56] References Cited

U.S. PATENT DOCUMENTS

| | | | |
|---|---|---|---|
| 1,559,665 | 11/1925 | Berry et al. | 434/88 |
| 3,492,743 | 2/1970 | Schmidt | 434/88 |
| 3,680,224 | 8/1972 | Hall | 434/308 |
| 4,340,372 | 7/1982 | Brassine | 434/88 |
| 4,600,393 | 7/1986 | Rosenwinkel et al. | 434/88 |
| 4,604,062 | 8/1986 | Woods | 434/88 |

OTHER PUBLICATIONS

"Computerized 'drawing board' Saves Hundreds of Hours on Textile Patterns," Business Week, Nov. 26, 1966.

Primary Examiner—Gene Mancene
Assistant Examiner—L. Thomas
Attorney, Agent, or Firm—William Nitkin

[57] ABSTRACT

A system for teaching artistic methods and techniques by providing both images on a television screen and instructional data and providing means for copying the image on a sheet of clear or translucent material place on a portion of the television screen.

10 Claims, 1 Drawing Sheet

METHOD OF ART INSTRUCTION

BACKGROUND OF THE INVENTION

1. Field of the Invention

This invention relates to a system for teaching artistic methods and techniques and more particularly relates to a method of providing art instruction using the medium of television.

2. Description of the Prior Art

Various means and devices have been utilized in the prior art to enable one to duplicate a pattern or design such as the use of tracing paper, pantographs and the use of projection equipment.

SUMMARY OF THE INVENTION

It is an object of this invention to provide a system for teaching drawing and painting techniques to art students by providing images on a television screen to be copied by placing over such television screen a sheet of clear or translucent material upon which the student can duplicate by tracing or painting the image below the sheet which sheet can be adhered to the screen by adhering means or in one embodiment can be adhered by static attraction. The sheet, after the image on the screen has been copied, can be placed over a sheet of non-translucent paper for display purposes. Instructional information can be provided in one section of the screen.

DESCRIPTION OF THE PREFERRED EMBODIMENT(S)

Figure 2:
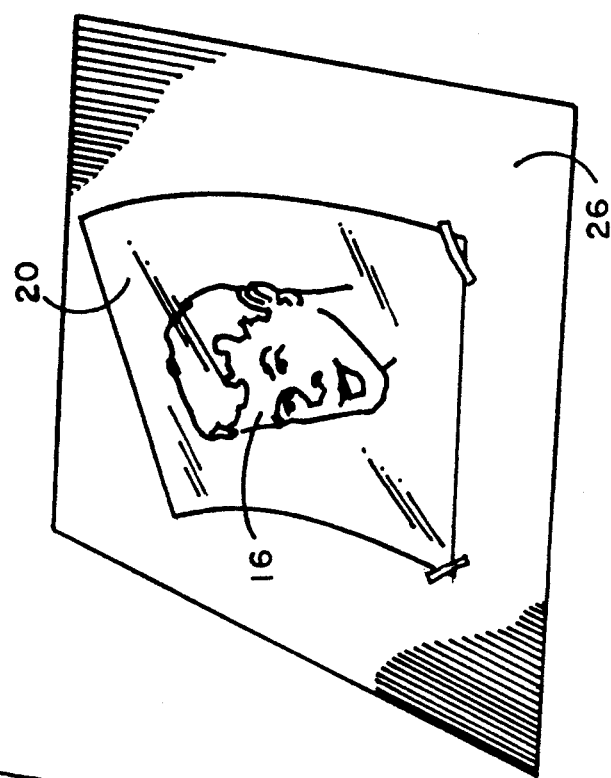
FIG. 2 illustrates the sheet being placed over a non-translucent paper for display purposes.
Figure 1:
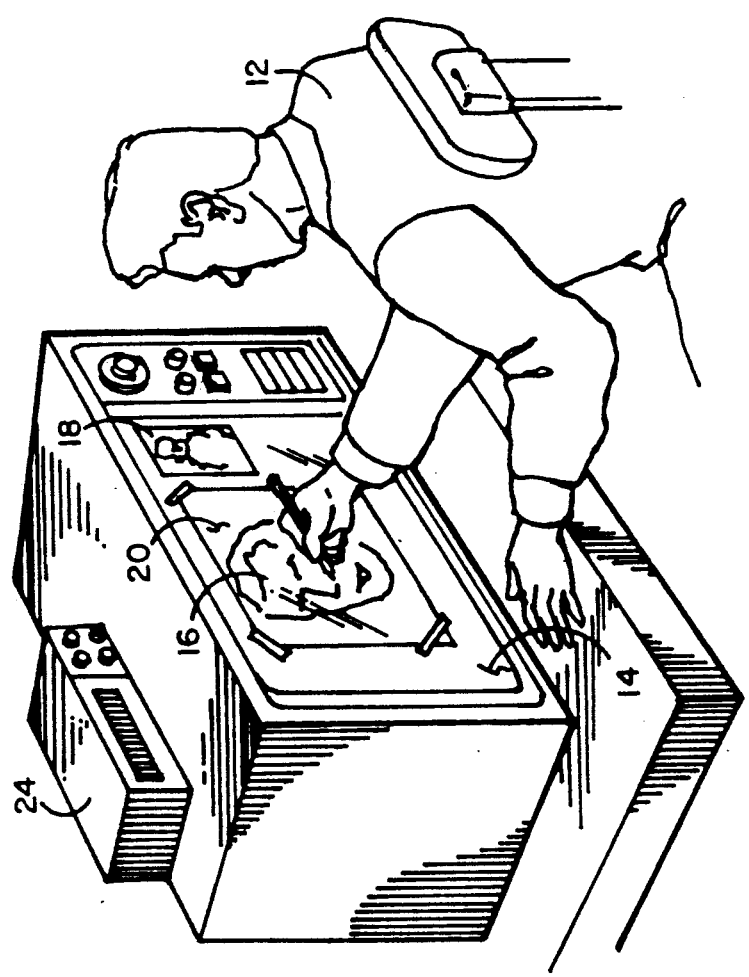
FIG. 1 illustrates a student utilizing the system of this invention.

FIG. 1 illustrates an art student 12 before a television set 14 on the screen of which is displayed an image 16 to be copied, such image either broadcast over the air or provided from a video tape on a VCR 24. A sheet 20 of clear or translucent material such as vinyl or equivalent translucent paper can be provided along with suitable marking means such as pencil, pen, charcoal. If painting techniques are being taught, a sheet of oiled paper and paint brushes can be provided to the art student. Sheet 20 can be taped to the television screen or otherwise adhered to the screen, for example, by static attraction if the tracing sheet is of a plastic material. An uncovered portion of screen 14 can have an art teacher 18 give verbal instructions or demonstrations of technique concerning the image on the screen which image and technique student 12 can try to duplicate. By having the teacher give instructions at the same time that the student practices copying the image with pen, ink or charcoal or paints with oil paint, acrylics or water color paints, the student can better learn the techniques being taught. Image 16 on sheet 20 can when completed can be removed and, as seen in FIG. 2, can be adhered to a non-translucent sheet of background paper 26 for display.

It should be noted that the television utilized with the system of this invention can have a brightness control so that the art student can adjust the television for a brightness setting suitable for copying the image on the screen. For example if the art lesson concerned the proper layering of paint to create a desired image, increasing the brightness of the image on the television screen would allow the image of subsequent layers of paint to be visible through a previous layer or layers of paint. The image could be changed also for each subsequent layer of paint to be applied. If a VCR is utilized, it should have enhancements which eliminate any lines running through a paused image on the television screen which lines would make such image difficult to duplicate on the screen.

The system of this invention is excellent for making animation cells from paused images of continuous action. One can also make videos whether of scenery or action shots and make artwork therefrom, selecting the best views and/or stop action images from which to make such artwork. Many techniques can be used, such as outlining an object on the sheet on the screen or other types of image simplification using fewer lines or features than are found in the original image. Practice techniques can include following a plurality of moving markers one at a time to learn particular brushstrokes. These practice markers can be displayed in a series on the screen for repetitive practice. In some cases where no permanent image is desired, an erasable mark can be used with the image either wiped or washed off the sheet, if desired.

Many computers have interactive screens which, when touched, sense the position of contact and react accordingly. Such computer screens can be used with this invention for interactive teaching where the instructor at a remote location can see what each student is drawing by having such sensed contacts directed to such remote location and displayed on a screen viewed by the instructor. In this way the instructor can critique the student's work as the student is working and broadcast such comments back over the student's television.

It is felt that using a system of this invention will provide an art student with hands-on experience while benefitting from professional instruction outside a classroom setting.

Although the present invention has been described with reference to particular embodiments, it will be apparent to those skilled in the art that variations and modifications can be substituted therefor without departing from the principles and spirit of the invention.

I claim:

1. A method for teaching artistic methods and techniques, comprising the steps of:
   providing a television set;
   providing an image and instructions on the screen of said television;
   providing a sheet of translucent material;
   adhering said sheet of translucent material over the portion of said screen on which said image appears;
   providing a marking instrument suitable for marking said sheet; and
   copying said image on said sheet with said marking instrument.

2. The method of claim 1 further including the steps of:
   removing said sheet with copied image thereon from said television screen; and
   adhering said sheet to a non-translucent sheet for display thereof.

3. The method of claim 1 wherein said copying step includes tracing said image on said sheet.

4. The method of claim 1 wherein said copying step includes painting said image on said sheet.

5. The method of claim 1 wherein said step of providing an image includes the step of presenting a image to be duplicated as a series of images to be copied in a desired sequence.

6. The method of claim 5 wherein said television set has a brightness control and said system further including the steps of:
- applying a plurality of layers of paint to said sheet to duplicate said series of images on said screen; and
- adjusting the brightness of said television screen to enable said televised series of images to be seen through initial and subsequent layers of paint applied to said sheet.

7. The method of claim 6 further including the step of changing the image on said television screen for each subsequent layer of paint to be applied to said sheet.

8. The method of claim 1 further including the steps of:
- providing a portion of said television screen that is not covered by said sheet of translucent material; and
- displaying instructional data in said uncovered portion of said screen.

9. The method of claim 1 further including the steps of:
- providing said television with means to sense the image drawn on said sheet on said screen;
- transmitting said image to a remote location to be viewed by an instructor;
- reviewing said image by said instructor; and
- transmitting comments of said instructor over said television to said person making said image on said sheet on said screen.

10. A method for producing animation cells, comprising the steps of:
- providing a television set;
- providing an image on the screen of said television;
- providing a sheet of translucent material;
- adhering said sheet of translucent material over the portion of said screen on which said image appears;
- providing a marking instrument suitable for marking said sheet; and
- copying said image on said sheet with said marking instrument.

* * * * *